US005530305A

United States Patent [19]
Krueger et al.

[11] Patent Number: 5,530,305
[45] Date of Patent: Jun. 25, 1996

[54] MARINE ENGINE ALTERNATOR CONSTRUCTION

[75] Inventors: William R. Krueger, New Berlin; David W. Windstein, Pewaukee; Paul W. Breckenfeld, Kenosha, all of Wis.; James R. DeRam, Libertyville; Gregory J. Binversie, Grayslake, both of Ill.

[73] Assignee: Outboard Marine Corporation, Waukegan, Ill.

[21] Appl. No.: 181,578

[22] Filed: Jan. 13, 1994

[51] Int. Cl.$^6$ .............................. H02K 7/02; H02K 1/22
[52] U.S. Cl. ........................................... 310/74; 310/263
[58] Field of Search ........................ 310/70 R, 74, 310/168, 68 D, 232, 263; 123/149 D, 179.28, 179.29; 322/4; 290/32, 33, 46

[56] References Cited

U.S. PATENT DOCUMENTS

| | | | |
|---|---|---|---|
| Re. 21,679 | 12/1940 | Jacobi | 123/149 |
| 1,109,192 | 9/1914 | Wright | 123/149 D |
| 1,447,371 | 3/1923 | Andrews et al. | 123/149 D |
| 2,147,381 | 2/1939 | List et al. | 322/4 |
| 2,605,753 | 8/1952 | Madle | 123/149 |
| 2,643,274 | 6/1953 | Miller | 123/148 |
| 3,215,877 | 11/1965 | Raver et al. | 310/168 |
| 3,317,765 | 5/1967 | Cone | 310/74 |
| 3,623,467 | 11/1971 | Piteo | 123/149 |
| 3,694,661 | 9/1972 | Minowa | 310/168 |
| 3,933,139 | 1/1976 | Beeghly | 123/148 |
| 4,100,440 | 7/1978 | Binder et al. | 310/68 D |
| 4,628,891 | 10/1986 | Asai et al. | 123/599 |
| 4,687,945 | 8/1987 | Ebeling | 290/37 |
| 4,958,095 | 9/1990 | Uchida et al. | 310/263 |
| 4,959,595 | 9/1990 | Nishimura | 310/102 R |
| 5,118,978 | 6/1992 | Matsumoto et al. | 310/153 |
| 5,237,230 | 8/1993 | Sugiyama et al. | 310/113 |
| 5,245,954 | 9/1993 | Donohue | 123/149 D |

FOREIGN PATENT DOCUMENTS

| | | | |
|---|---|---|---|
| 2613194 | 11/1976 | Germany | 310/263 |
| 54-162112 | 12/1979 | Japan | 310/74 |
| 2086147 | 5/1982 | United Kingdom | 310/74 |

*Primary Examiner*—Clayton E. LaBalle
*Attorney, Agent, or Firm*—Michael, Best & Friedrich

[57] ABSTRACT

Disclosed herein is an engine assembly comprising an engine block, a crankshaft rotatably mounted in the engine block and having an end and an axis, a flywheel fixed to the end of the crankshaft and including a first flux plate including a plurality of angularly spaced pole pieces extending axially away from the end of the crankshaft, a second flux plate axially spaced from the first flux plate and including a plurality of angularly spaced pole pieces extending toward the first flux plate and being spaced from and inter-digitated between the pole pieces of the first flux plate, a core extending axially between the first and second flux plates, a coil located in surrounding relation to the core and radially inwardly of the pole pieces and between the first and second flux plates, and a stator coil stationarily mounted on the engine block in outward, radially adjacent relation to the pole pieces, and slip ring means mounted on the flywheel and on the engine block and connected to the coil for energization thereof.

20 Claims, 3 Drawing Sheets

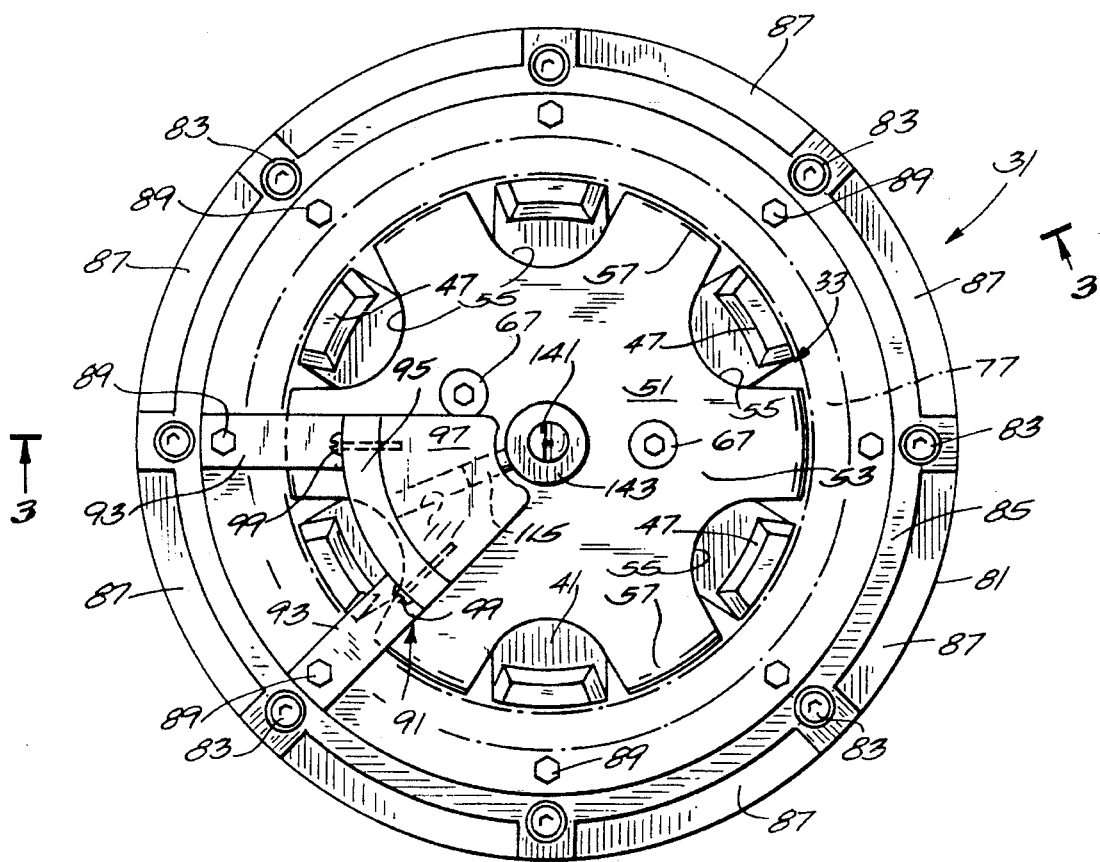

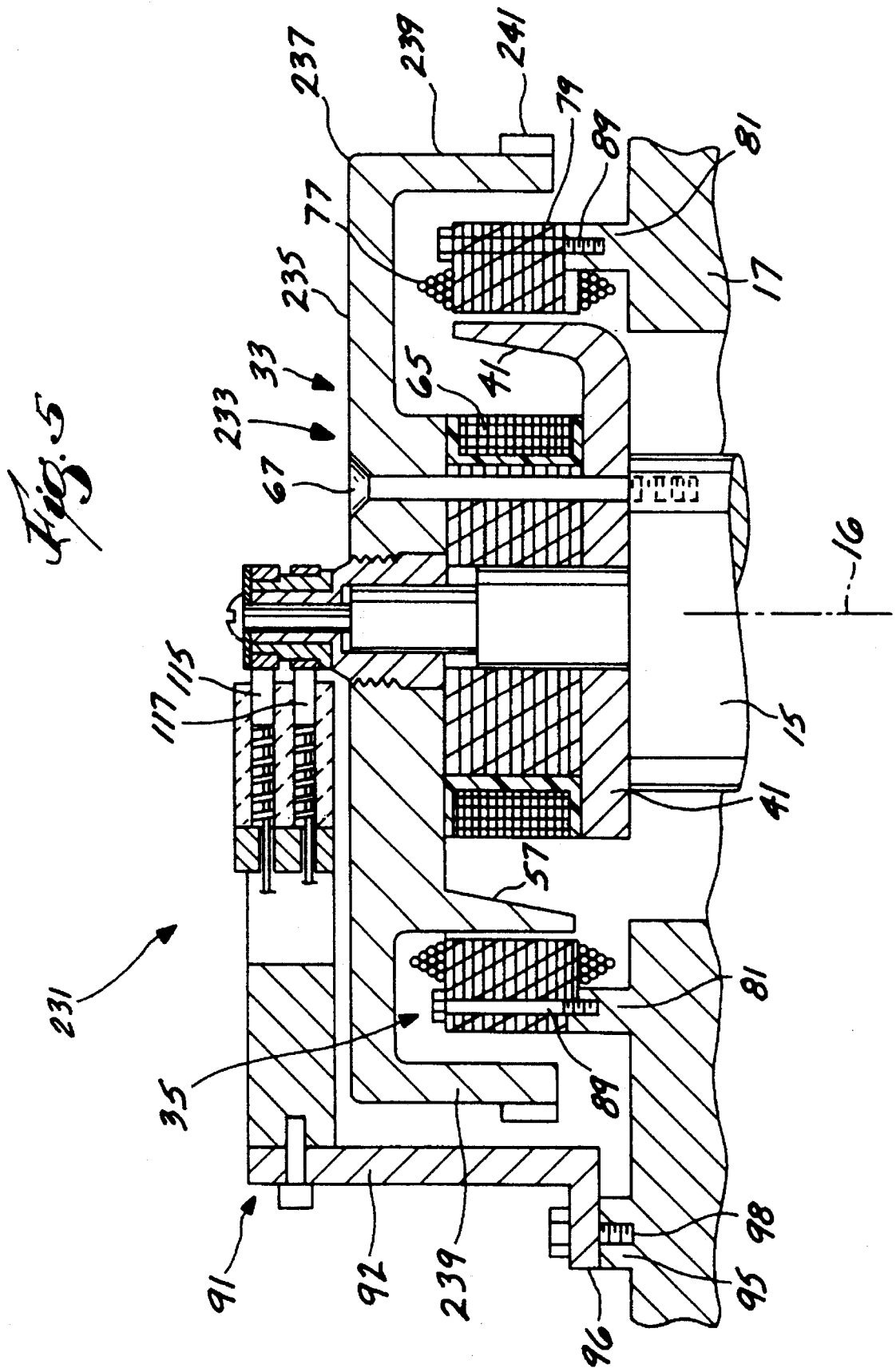

MARINE ENGINE ALTERNATOR CONSTRUCTION

BACKGROUND OF THE INVENTION

The invention relates generally to internal combustion engines including generators or alternators which include, as one component, an engine flywheel.

The prior general practice for two cycle marine internal combustion engines is to bond permanent magnets on the inner underside of a cast aluminum or iron flywheel. The flywheel is, in turn, mounted on the end of the crankshaft and in surrounding relation to the stator coils which are stationarily located within the confines of the flywheel. Current is generated by rotation of the magnets which are mounted on the flywheel and which travel past the stator coils to cut the magnetic lines of flux and generate current flow in the stator coils.

These prior constructions were burdened by problems which include, but are not limited to, current capability due to the inability to cool the stator in its position under the flywheel, high cost of the permanent magnets, difficulty in bonding the magnets to the flywheel, inability to regulate the magnetic field of the permanent magnets which forces energy to simply be wasted when not required, and high cost and difficulty in manufacturing the aluminum flywheel with a steel or iron core.

Attention is directed to the following United States patents:

| 1,109,192 | G. Wright | September 1, 1914 |
| 1,447,371 | Andrews, et al. | March 6, 1923 |
| 2,605,753 | A. M. Madle | August 5, 1952 |
| 2,643,274 | S. E. Miller | June 23, 1953 |
| 3,623,467 | M. J. Piteo | November 30, 1971 |
| 3,933,139 | B. R. Beeghly | January 20, 1976 |
| 4,628,891 | Asai, et al. | December 16, 1986 |
| 4,687,945 | D. C. Ebeling | August 18, 1987 |
| 5,118,978 | Matsumoto, et al. | June 2, 1992 |
| Re.21,679 | E. N. Jacobi | December 31, 1940 |

SUMMARY OF THE INVENTION

The invention provides a flywheel comprising a first member including a plurality of angularly spaced pole pieces extending axially in one direction, a second member axially spaced from the first member in the direction of the extension of the pole pieces and including a second plurality of angularly spaced pole pieces extending toward the first member and being spaced from and inter-digitated between the pole pieces of the first member, a core extending axially between the first and second members, a coil located in surrounding relation to the core and radially inwardly of the pole pieces and between the first and second members, and slip ring means fixed to one of the members and connected to the coil for energization thereof.

The invention also provides a flywheel assembly comprising a crankshaft having an end and an axis, and a flywheel fixed to the end of the crankshaft and including a first member including a plurality of angularly spaced pole pieces extending axially away from the end of the crankshaft, a second member axially spaced from the first member and including a plurality of angularly spaced pole pieces extending toward the first member and being spaced from and inter-digitated between the pole pieces of the first member, a core extending axially between the first and second members, a coil located in surrounding relation to the core and radially inwardly of the pole pieces and between the first and second members, and slip ring components connected to the coil for energization thereof.

The invention also provides an engine assembly comprising an engine block, a crankshaft rotatably mounted in the engine block and having an end and an axis, a flywheel fixed to the end of the crankshaft and including a first flux plate including a plurality of angularly spaced pole pieces extending axially away from the end of the crankshaft, a second flux plate axially spaced from the first flux plate and including a plurality of angularly spaced pole pieces extending toward the first flux plate and being spaced from and inter-digitated between the pole pieces of the first flux plate, a core extending axially between the first and second flux plates, a coil located in surrounding relation to the core and radially inwardly of the pole pieces and between the first and second flux plates, a stator coil stationarily mounted on the engine block in outward, radially adjacent relation to the pole pieces, and slip ring means mounted on the flywheel and on the engine block and connected to the coil for energization thereof.

The invention also provides a flywheel adapted to be rotatable about an axis and comprising a first member including a first portion extending perpendicularly to the axis and having an outer periphery, a cylindrical portion extending in one axial direction from the outer periphery, a ring gear portion extending radially outwardly from the cylindrical portion, and a plurality of angularly spaced pole pieces extending axially in the one axial direction from the first portion of the first member and in radially inwardly spaced relation from the cylindrical portion, a second member spaced axially in the one direction from the first portion of the first member and including a second plurality of angularly spaced pole pieces located in radially inwardly spaced relation from the cylindrical portion of the first member, extending toward the first portion of the first member, and being spaced from and inter-digitated between the pole pieces of the first member, a core extending axially between the first and second members, a coil located in surrounding relation to the core and radially inwardly of the pole pieces and between the first and second members, and slip ring means fixed to one of the members and connected to the coil for energization thereof.

The invention also provides a flywheel assembly comprising a crankshaft having an axis, and a flywheel fixed to the crankshaft and including a first member including a first portion extending perpendicularly to the axis and having an outer periphery, a cylindrical portion extending in one axial direction from the outer periphery, a ring gear portion extending radially outwardly from the cylindrical portion, and a plurality of angularly spaced pole pieces extending in the one axial direction from the first portion of the first member and in radially inwardly spaced relation from the cylindrical portion, a second member spaced axially in the one axial direction from the first portion of the first member and including a plurality of angularly spaced pole pieces located in radially inwardly spaced relation from the cylindrical portion of the first member, extending toward the first portion of the first member, and being spaced from and inter-digitated between the pole pieces of the first member, a core extending axially between the first and second members, a coil located in surrounding relation to the core and radially inwardly of the pole pieces and between the first and second members, and slip ring means connected to the coil for energization thereof.

The invention also provides an engine assembly comprising an engine block, a crankshaft rotatably mounted in the engine block and having an axis, a flywheel fixed to the crankshaft and including a first member including a first portion extending perpendicularly to the axis and having an outer periphery, a cylindrical portion extending from the outer periphery and in the axial direction toward the engine block, a ring gear portion extending radially outwardly from the cylindrical portion, and a plurality of angularly spaced pole pieces extending in the axial direction and in radially inwardly spaced relation from the cylindrical portion, a second member spaced axially from the first portion of the first member in the axial direction and including a plurality of angularly spaced pole pieces located in radially inwardly spaced relation from the cylindrical portion of the first member, extending toward the first portion of the first member, and being spaced from and inter-digitated between the pole pieces of the first member, a core extending axially between the first and second members, a coil located in surrounding relation to the core and radially inwardly of the pole pieces and between the first and second members, and a stator coil stationarily mounted on the engine block in outward, radially adjacent relation to the pole pieces and in radially inwardly spaced relation from the cylindrical portion of the first member, and slip ring means mounted on the flywheel and on the engine block and connected to the coil for energization thereof.

Other features and advantages of the invention will become apparent to those skilled in the art upon review of the following detailed description, claims, and drawings.

THE DRAWINGS

FIG. 2 is an enlarged top elevational view of the alternator assembly incorporated in the outboard motor shown in FIG. 1.

FIG. 3 is a side elevational view, partially in section and partially schematic, taken along line 3—3 of FIG. 2.

FIG. 5 is a broken away, partially in section, side elevational view which is similar to FIG. 3 and which illustrates another embodiment of an alternator assembly incorporating various of the features of the invention.

Figure 1:
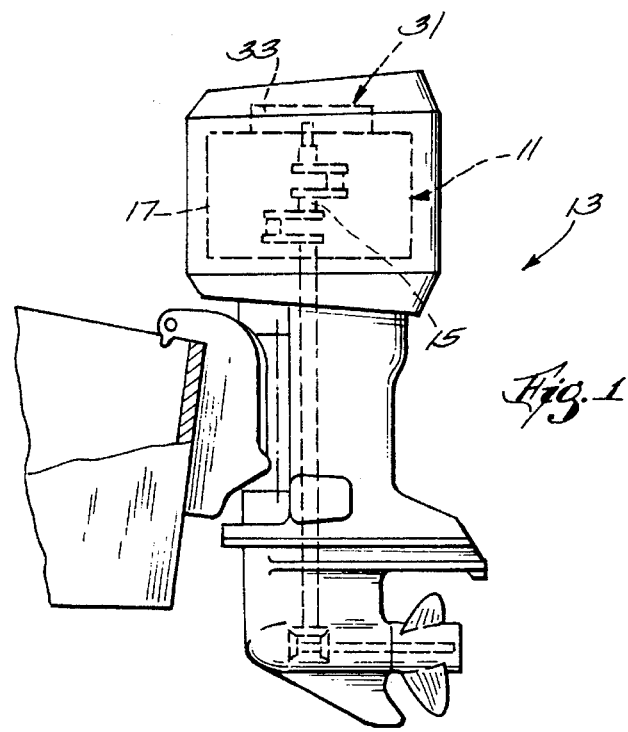
FIG. 1 is a partially broken away and partial schematic side elevational view of an outboard motor incorporating various of the features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Shown fragmentarily in the drawings is a two-stroke internal combustion engine 11 forming a part of an outboard motor 13. The engine 11 includes a vertically extending crankshaft 15 which has an axis 16, which is suitably mounted for rotation in an engine block 17, and which comprises an outer upper end portion 19 extending above the engine block 17 and including a shoulder 18, an axially inner, first reduced diameter sub-portion 21 extending from the shoulder 18, and an axially outer, second further reduced diameter sub-portion 23.

The engine 11 also includes an alternator assembly 31 comprising a rotor assembly 33 which also functions as a flywheel and which is mounted on and has common rotation with the crankshaft 15, and a stator assembly 35 which is mounted on the engine block 17.

The rotor assembly or flywheel 33 can take various configurations and, in the disclosed construction, is mounted on the outer end portion 19 of the crankshaft 15 and comprises (see FIG. 3) a first member or lower flux plate 41 which is fabricated of ferrous material, which includes a disc portion 43 engaging the shoulder 18 and including a central aperture 44 receiving the axially inner sub-portion 21 of the crankshaft 15, a periphery having (see FIG. 4) a plurality of evenly angularly spaced scallops or arcuate cut-outs 45, and a like plurality of ears, fingers, or pole pieces 47 which extend from the periphery of the disc portion 43 in the areas intermediate the cut-outs 45, in the axial direction away from the crankshaft 15, and in evenly angularly spaced relation to one another.

The rotor assembly or flywheel 33 also includes a second member or upper flux plate 51 which is fabricated of ferrous material and which includes a circular disc portion 53 including a central aperture 54, a periphery having a plurality of evenly angularly spaced scallops or arcuate cut-outs 55, and a like plurality of ears, fingers, or pole pieces 57, which extend from the periphery of the disc portion 53 in the areas intermediate the cut-outs 55, in the axial direction toward the first flux plate 41, in evenly angularly spaced relation to one another, and in interdigitated relation to the pole pieces 47 of the first flux plate 41. The pole pieces 47 and 57 include radially outer surfaces extending at a common distance from the axis 16 of the crankshaft 15.

The rotor assembly or flywheel 33 also includes a core 61 which extends axially between the flux plates 41 and 51, which includes a central aperture 62 receiving the axially inner sub-portion 21 of the crankshaft 15, and which can be of one piece ferrous construction or can include (as shown) a plurality of laminations formed of ferrous material. As can be seen, the core 61, together with the flux plates 41 and 51, define an annular recess in which is located a bobbin 63 supporting a coil or winding 65 which also forms a part of the rotor assembly or flywheel 33.

The alternator assembly 31 also includes means for fastening together the core 61 and the flux plates 41 and 51 and for fastening the rotor assembly or flywheel 33 to the crankshaft 15. While various arrangements can be employed, in the disclosed construction, a plurality of bolts 67 extend through the core 61 and the flux plates 41 and 51 and into the outer upper end portion 19 of the crankshaft 15.

The stator assembly 35 can take various configurations and, in the disclosed construction, comprises a series of circular or ring shaped laminations 71 which constitute a stator 72 and which include radially inner angularly spaced poles or surfaces 73 located in radially outward, adjacent relation to the path of movement of the pole pieces 47 and 57 of the rotor assembly or flywheel 33.

The stator assembly 35 also includes a suitable winding or windings 77 on the stator 72.

Means are also provided for fixedly mounting the stator assembly 35 to the engine block 17. While various arrangements can be employed, in the disclosed construction, such means comprises, on the engine block 17, an upstanding portion or mounting ring 81 which respectively has fixed thereon, by a plurality of suitable bolts 83, an adapter or ring 85 which inclines radially inwardly and which includes a plurality of axially spaced apertures 87 forming a part of a path for cooling air. In turn, the stator assembly 35 is fixed to the engine block 19 by bolts 89 which extend through the stator 72 and into the adaptor or ring 85.

The alternator assembly 31 also includes suitable means for supplying electrical current to the coil or winding 65 in the rotor assembly or flywheel 33. While various other arrangements can be employed, in the disclosed construction, the alternator assembly 31 includes stationary slip ring means fixed on the engine block 17 and comprising (see FIG. 3) a mounting bracket 91 which includes two angularly spaced legs 92 and which is suitably mounted on the engine block 19 by two of the bolts 89 which fix the stator assembly 35 on the adaptor or ring 85. The mounting bracket 91 includes angularly spaced horizontally extending arms 93 which are connected to a radially inwardly located arcuate portion 95. In turn, a brush mounting block 97 fabricated of electrically insulating ceramic material, is fixed to the arcuate portion 95 by suitable means, such as a plurality of screws 99. The mounting block 97 includes vertically spaced, radially extending upper and lower bores 111 and 113 which respectively house conventional electrical contact members or brushes 115 and 117 which project radially inwardly from the mounting block 97 and which are electrically connected to suitable leads 119 to a voltage regulator 120.

The means for supplying electrical energy to the coil or winding 61 of the stator assembly 35 also includes rotatable slip ring means mounted on the rotor assembly or flywheel 33 and including a pair of axially spaced, upper and lower electrical contact members or components or rings 121 and 123 which are respectively electrically contacted by the brushes 115 and 117 and which are respectively electrically connected to the leads (not shown) of the coil 61 in the rotor assembly or flywheel 33. The electrical contact members 121 and 123 are fixedly mounted on a stepped tubular contact sleeve 125 which, in turn, is mounted on an upper or outer tubular portion 127 of a tubular member, post, or stud 131 which also includes a lower tubular or base portion 133 which is suitably fixed in the aperture 54 of the upper flux plate 51, as by screw threading, or by other suitable means, and which includes an inner annular surface 135 in engagement with the outer sub-portion 23 of the crankshaft 15 to insure proper concentricity. The control sleeve 125 can be fixed for common rotation with the tubular post 131 by suitable means, such as a keyway (not shown).

Extending through the axial bore in the upper portion 127 of the tubular stud is a screw 141 which is threaded into the upper or outer sub-portion 23 of the crankshaft 15 and which, in cooperation with a washer 143, fixes the tubular contact sleeve 125 on the tubular stud or post 131. Suitable axially and radially extending slots in the mounting stud 131 or tubular contact sleeve 125 and in the lower face of the upper flux plate 51 can be employed to permit passage of the electrical leads (not shown) from the coil 61 to the electrical contact members or rings 121 and 123.

The rotor assembly or flywheel 33 also preferably includes fan means for circulating air from the area of the rotor assembly or flywheel 33 and from the area of the stator assembly 35, thus cooling the alternator assembly 31. While other arrangements can be employed, in the disclosed construction, a fan member 151 is secured by suitable means, such as the illustrated rivets 153, to the under surface of the lower flux plate 41. Preferably, the fan member 151 is fabricated as a unitary plastic piece and comprises an annular portion 155 engaging the outer margin of the disc portion 43 of the lower flux plate 41, and a series of vertically projecting radially extending and angularly spaced fan blades or vanes 157 adapted to cause, incident to rotation of the rotor assembly or flywheel 33, air flow radially inwardly through the apertures 87 in the adaptor or ring 85, through the space between the stator assembly 35 and the engine block 17 and then upwardly through the cut-outs 45 and 55.

The rotor assembly or flywheel 33 also preferably includes a ring gear 161 adapted for engagement with a pinion (not shown) on a starter motor (not shown). While various arrangements can be employed, in the disclosed construction, the ring gear 161 is part of or is mounted on the under surface of the outer periphery of the fan member 151 and is accessible through a suitable opening (not shown) in the ring or portion 81 and in the adaptor ring 85.

In operation, crankshaft rotation causes rotation of the rotor or flywheel assembly 33 past the radially outwardly located stator assembly 35, thereby generating electrical potential.

The disclosed construction provides a rotor assembly which has sufficient mass or weight to function as a flywheel and which constitutes an electromagnet of variable flux density.

The disclosed construction advantageously affords employment of a stator assembly 35 having a larger diameter than used heretofore, thereby allowing use of more coils and higher relative speeds between the flywheel pole pieces 47 and 57 and the stator poles 73 so as to provide increased electrical output.

Furthermore, the mounting of the stator assembly 35 in radially outward relation to the rotor assembly or flywheel 33 makes possible water or oil cooling (not shown) of the stator assembly 35.

In addition, the relatively large diameter of the stator assembly 35 and the location thereof, radially outwardly of the rotor assembly or flywheel 33, results in lower heat density or temperatures. Moreover, cooling of the alternator assembly 31 becomes much less of a problem because the stator assembly 35 is located away from under the prior art flywheel, and because of the presence of suitable fan means.

Still further, the disclosed construction permits energy management by varying the current to the coil 65 in the rotor assembly or flywheel 33 so as to enable production of whatever specific potential is desired, thus lowering parasitic loses.

The disclosed use of variable flux generation in the rotor assembly or flywheel 33 permits the use of smaller, cheaper, three phase field control regulators, such as used in the automotive industry, instead of larger and more expensive regulators for controlling excess energy.

Furthermore, the disclosed construction affords elimination of the cost of casting the prior composite aluminum flywheel, including the cost of permanent magnets, and the prior boring operation.

Shown in FIG. 5 is a second embodiment of an alternator assembly 231 which, except as noted hereinafter, is similar to the alternator assembly 31 shown in FIGS. 2 through 4, and which has the same reference numerals applied to the components thereof which are the same as, or are similar to, the corresponding components of the alternator assembly 31.

Figure 4:
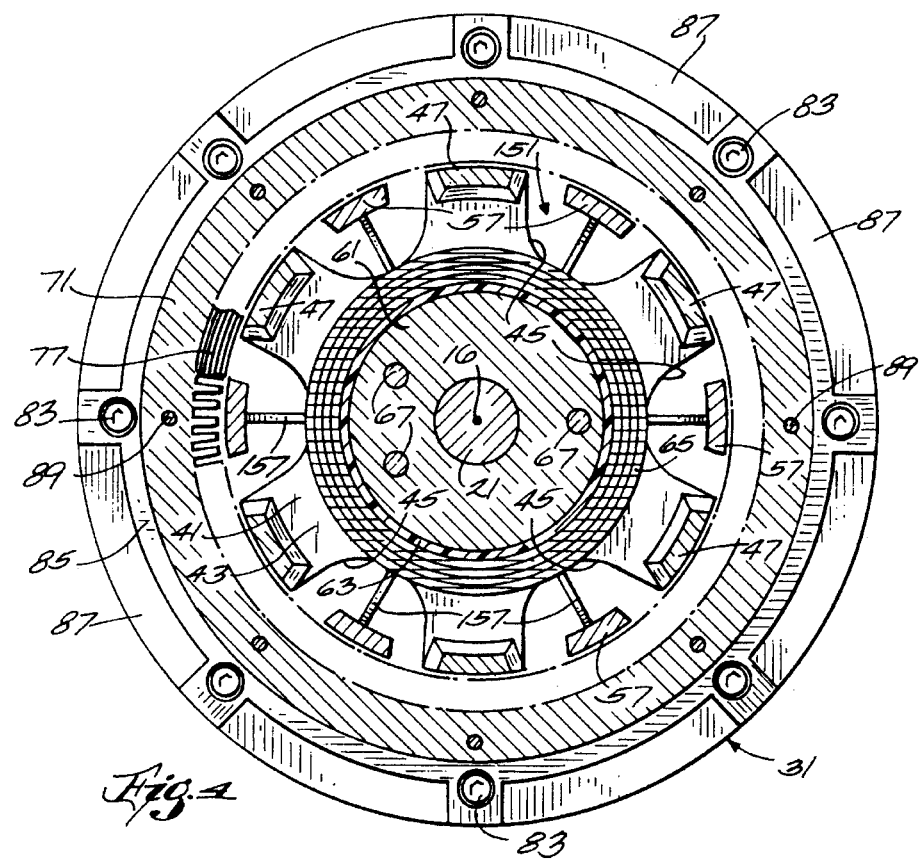
FIG. 4 is an enlarged view, partially in section, along line 4—4 of FIG. 3.

The alternator assembly 231 shown in FIG. 5 differs primarily from the alternator assembly 31 shown in FIGS. 2 through 4 in that the second member 51 disclosed in connection with the alternator assembly 31 of FIGS. 2, 3, and 4 forms a part of a flywheel member 233 which has a general configuration similar to that of previous flywheels in that it includes a generally flat circular web portion 235 extending generally perpendicularly to the crankcase axis 16 and having a circular outer periphery 237, a cylindrical portion 239 extending from the outer periphery 237 in the axial direction toward the engine block 17, and a starter gear portion 241 extending radially outwardly from the cylindrical portion 239. Unlike previous flywheels, the flywheel member 233 does not include any permanent magnets fixed on the inside of the cylindrical portion.

In addition, as shown in FIG. 5, the cylindrical portion 239 of the flywheel member 233 is located in radially spaced outward relation to the stator assembly 35. As in the alternator assembly 31 shown in FIGS. 2 through 4, the flywheel member 233 also includes a plurality of pole pieces 57 which extend toward the engine block 17 and are generally identical to the pole pieces 57 described with respect to the alternator assembly 31 shown in FIGS. 2 through 4. The flywheel member 233 is preferably fabricated as a one-piece member from ferous material.

As in the embodiment shown in FIGS. 2 through 4, the alternator assembly 231 shown in FIG. 5 includes a stator 72 which is mounted in radially outwardly adjacently spaced relation to the pole pieces 47 and 57. In the alternator assembly 231, the stator 72 is fixedly mounted radially inwardly of the cylindrical portion 239 of the flywheel member 233 on an upstanding mounting ring 81 formed as a part of the engine block 17 by the bolts 89. Other arrangements for mounting the stator assembly 35 on the engine block 17 can also be employed.

The alternator assembly 231 shown in FIG. 5 also differs from the alternator assembly 231 shown in FIGS. 2 through 4 in that the angularly spaced legs 92 (one shown) of the mounting bracket 91 for the brushes 115 and 117 include respective flanges 96 which are fixed by suitable bolts 98 on a pair of angularly spaced bosses 94 (one shown) formed on the engine block 17 in radially outward relation from the mounting ring 81 and at a radial outward distance from the crankshaft axis 16 such that the mounting bracket legs 92 (one shown) are located radially outwardly of the path of rotation of the starter gear portion 241 of the flywheel member 233.

The alternator assembly 231 shown in FIG. 5 also differs from the alternator assembly 231 shown in FIGS. 2 through 4 in that the fan 151 is omitted and in that the ring 85 and the aperatures 87 therein are omitted. In addition, the alternator assembly 231 shown in FIG. 5 is especially advantageous as it encloses and covers the relative rotary movement of the pole pieces 47 and 57 relative to the stator assembly 35, thereby effectively eliminating any possibility of foreign matter being entangled therein.

The flywheel member 233 can be provided with apperatures (not shown) as desired, either in the webbed portion 235 or in the cylindrical portion 239 to permit air flow in order to cool the coils 65 and 77. In addition, fan vanes (not shown) can be added to the rotor assembly or flywheel 33 to cause such air flow.

Various of the features of the invention are set forth in the following claims.

We claim:

1. A flywheel comprising a rotatable assembly which is adapted to be rotatably mounted on an engine block and which includes a first member including a plurality of angularly spaced pole pieces extending axially in one direction, a second member axially spaced from said first member in the direction of the extension of said pole pieces and including a second plurality of angularly spaced pole pieces extending toward said first member and being spaced from and inter-digitated between said pole pieces of said first member, a core extending axially between said first and second members, a coil located in surrounding relation to said core and radially inwardly of said pole pieces and between said first and second members, and a slip ring member fixed to one of said first and second members and connected to said coil for energization thereof.

2. A flywheel in accordance with claim 1 wherein said flywheel also includes a fan member mounted on one of said members.

3. A flywheel in accordance with claim 1 and further including a ring gear mounted on one of said members.

4. A flywheel in accordance with claim 1 wherein said first and second members and said core are fabricated of ferrous material.

5. A flywheel assembly in accordance with claim 1 including fastening means for fixing said core and said first and second members to one another and to said crankshaft.

6. A flywheel assembly in accordance with claim 1 wherein said core comprises a plurality of laminations of ferrous material.

7. A flywheel assembly in accordance with claim 1 wherein said pole pieces extend at a common radial distance from said axis.

8. A flywheel in accordance with claim 1 wherein said slip ring means includes slip ring contact members stationarily mounted on said flywheel.

9. A flywheel in accordance with claim 1 wherein said members include an outer periphery from which said pole pieces extend and which include, between said pole pieces, a plurality of cut-outs affording air flow through said flywheel.

10. A flywheel assembly comprising a rotatable assembly which is adapted to be rotatably mounted on an engine block and which includes a crankshaft having an end and an axis, and a flywheel fixed to said end of said crankshaft and including a first member including a plurality of angularly spaced pole pieces extending axially away from said end of said crankshaft, a second member axially spaced from said first member and including a plurality of angularly spaced pole pieces extending toward said first member and being spaced from and inter-digitated between said pole pieces of said first member, a core extending axially between said first and second members, and a coil located in surrounding relation to said core and radially inwardly of said pole pieces and between said first and second members, and a slip ring member connected to said coil for energization thereof.

11. A flywheel assembly in accordance with claim 10 wherein said flywheel also includes a fan member mounted on one of said members.

12. A flywheel assembly in accordance with claim 10 and further including a ring gear mounted on one of said members.

13. A flywheel assembly in accordance with claim 10 wherein said pole pieces extend at a common radial distance from said axis.

14. A flywheel assembly in accordance with claim 10 wherein said core comprises a plurality of laminations of ferrous material.

15. A flywheel assembly in accordance with claim 14 wherein said pole pieces extend at a common radial distance from said axis.

16. An engine assembly comprising an engine block, a rotating assembly including a crankshaft rotatably mounted in said engine block and having an end and an axis, a flywheel fixed to said end of said crankshaft and including a first member including a plurality of angularly spaced pole pieces extending axially away from said end of said crankshaft, a second member axially spaced from said first member and including a plurality of angularly spaced pole pieces extending toward said first member and being spaced from and inter-digitated between said pole pieces of said first member, and a core extending axially between said first and second members, and a coil located in surrounding relation to said core and radially inwardly of said pole pieces and between said first and second members, and a stationary assembly including a stator coil stationarily mounted on said engine block in outward, radially adjacent relation to said pole pieces, and slip ring means mounted on said flywheel and on said engine block and connected to said coil for energization thereof.

17. An engine assembly in accordance with claim 16 wherein said pole pieces extend at a common radial distance from the axis of said crankshaft.

18. A flywheel comprising a rotatable assembly which is adapted to be rotatably mounted on an engine block and which includes a first member including a first portion extending perpendicularly to said axis and having an outer periphery, a cylindrical portion extending in one axial direction from said outer periphery, a ring gear portion extending radially outwardly from said cylindrical portion, and a plurality of angularly spaced pole pieces extending axially in said one axial direction from said first portion of said first member and in radially inwardly spaced relation from said cylindrical portion, a second member spaced axially in said one direction from said first portion of said first member and including a second plurality of angularly spaced pole pieces located in radially inwardly spaced relation from said cylindrical portion of said first member, extending toward said first portion of said first member, and being spaced from and inter-digitated between said pole pieces of said first member, a core extending axially between said first and second members, a coil located in surrounding relation to said core and radially inwardly of said pole pieces and between said first and second members, and slip ring means including a portion fixed to one of said members and connected to said coil for energization thereof.

19. A flywheel assembly comprising a rotatable assembly which is adapted to be rotatably mounted on an engine block and which comprises a crankshaft having an axis, and a flywheel fixed to said crankshaft and including a first member including a first portion extending perpendicularly to said axis and having an outer periphery, a cylindrical portion extending in one axial direction from said outer periphery, a ring gear portion extending radially outwardly from said cylindrical portion, and a plurality of angularly spaced pole pieces extending axially in said one axial direction from said first portion of said first member and in radially inwardly spaced relation from said cylindrical portion, a second member spaced axially in said one direction from said first portion of said first member and including a second plurality of angularly spaced pole pieces located in radially inwardly spaced relation from said cylindrical portion of said first member, extending toward said first portion of said first member, and being spaced from and inter-digitated between said pole pieces of said first member, a core extending axially between said first and second members, a coil located in surrounding relation to said core and radially inwardly of said pole pieces and between said first and second members, and slip ring means including a portion fixed to one of said members and connected to said coil for energization thereof.

20. An engine assembly comprising an engine block, a rotating assembly including a crankshaft rotatably mounted in said engine block and having an axis, a flywheel fixed to said crankshaft and including a first member including a first portion extending perpendicularly to said axis and having an outer periphery, a cylindrical portion extending from said outer periphery and in the axial direction toward said engine block, a ring gear portion extending radially outwardly from said cylindrical portion, and a plurality of angularly spaced pole pieces extending in said axial direction and in radially inwardly spaced relation from said cylindrical portion, a second member spaced axially from said first portion of said first member in said axial direction and including a plurality of angularly spaced pole pieces located in radially inwardly spaced relation from said cylindrical portion of said first member, extending toward said first portion of said first member, and being spaced from and inter-digitated between said pole pieces of said first member, a core extending axially between said first and second members, and a coil located in surrounding relation to said core and radially inwardly of said pole pieces and between said first and second members, a stationary assembly including a stator coil stationarily mounted on said engine block in outward, radially adjacent relation to said pole pieces and in radially inwardly spaced relation from said cylindrical portion of said first member, and slip ring means mounted on said flywheel and on said engine block and connected to said coil for energization thereof.

\* \* \* \* \*